April 28, 1925.
J. E. HARVEY
CONTROLLING MEANS FOR ELECTRICAL DEVICES
Filed Sept. 13, 1923
1,535,306
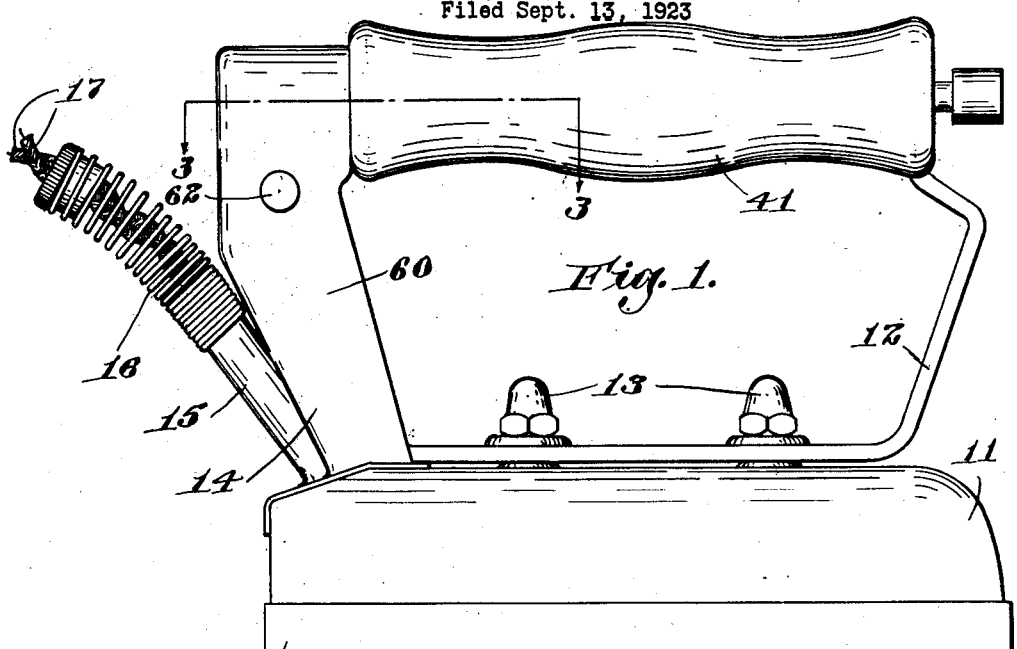
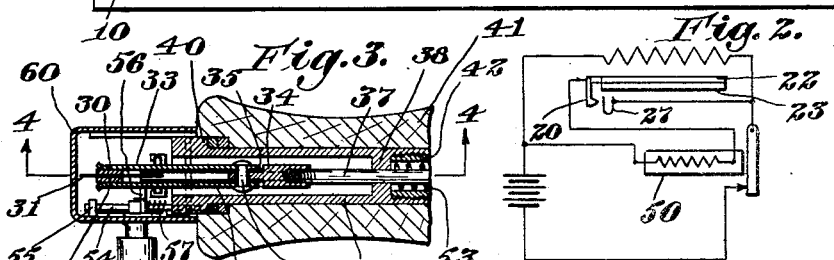
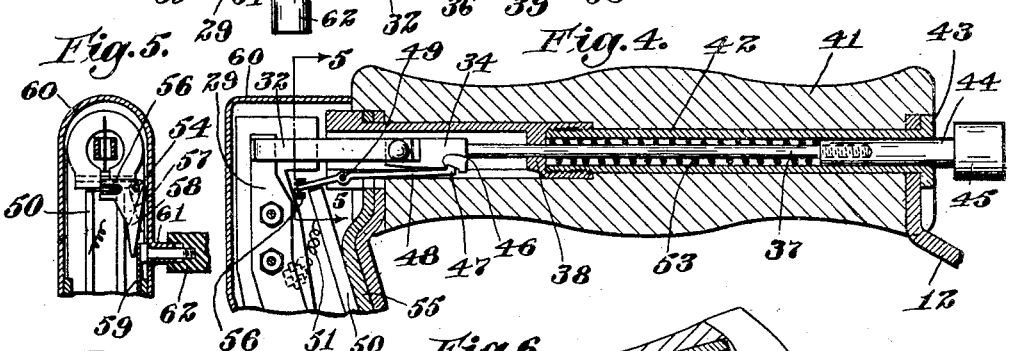
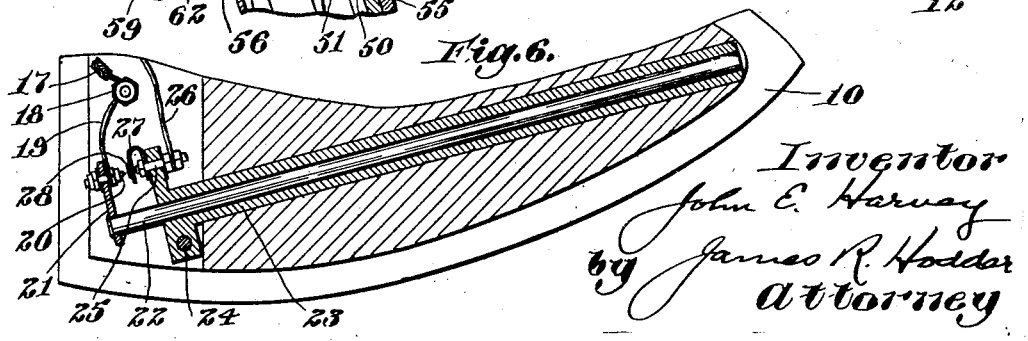
Inventor
John E. Harvey
by James R. Hodder
Attorney Patented Apr. 28, 1925.

1,535,306

UNITED STATES PATENT OFFICE.

JOHN E. HARVEY, OF DORCHESTER, MASSACHUSETTS.

CONTROLLING MEANS FOR ELECTRICAL DEVICES.

Application filed September 13, 1923. Serial No. 662,574.

*To all whom it may concern:*

Be it known that I, JOHN E. HARVEY, a citizen of the United States, and resident of Dorchester, in the county of Suffolk and State of Massachusetts, have invented an Improvement in Controlling Means for Electrical Devices, of which the following description, in connection with the accompanying drawings, is a specification, like letters on the drawings representing like parts.

My present invention relates to electrical heating devices, and more particularly to a controlling means for electrical heating devices such, for example, as electrical flatirons.

In my prior Patent No. 1,461,878, issued July 17, 1923, I have described and claimed an improved thermostatic control means for electrically heated devices of the portable type, such devices consisting essentially of a pair of thermostats associated with a manually operated switch and one of the thermostats directly controlling the switch to disconnect the source of power from the heating element, while the other thermostat is associated with the heating element and controls the first thermostat. My present invention is similar in its nature to that described and claimed in my copending application above referred to and the present application is to be considered as a continuation of said copending application and the subject matter thereof is to be considered as an improvement over the invention described in said copending application.

In portable electrical heating apparatus such, for example, as an electrically heated flatiron, the controlling switch is first manually operated and, except for turning off the power at the socket or plug, on the end of the cord, no means has heretofore been provided for shutting off the source of power other than the thermostatic control. A great many times it is disadvantageous to disconnect the cord from the source of power and at the same time it is desirable that the heating element be left in such condition as to prevent possible injury being caused thereto or thereby. Such heating element will have the power cut off therefrom when the temperature reaches too high a point by the operation of the plurality of thermostatic control devices, but in addition to being a safety device, desirable to provide means for temporarily disconnecting the heating elements from the source of power independently of the thermostatic controls and also independently of the operation of a switch, such as removing the plug from a socket, and an important object of my present invention is the provision of means associated with the control switch of an electrically heated device for temporarily operating such switch to disconnect the heating elements from the source of power.

A frequent source of injury to devices of this character and a frequent source of derangement of the adjustment of the parts thereof is the control points in the supply circuit controlled by the thermostatic elements, the frequent operation of such control points, while subjected to a high degree of heat, resulting in a freezing or pitting of the contact points themselves which, therefore, gradually wear away and necessitates frequent adjustment of the thermostatic devices. I have obviated this objectionable feature by the inclusion in such supply circuit of a spring contact point wherein a minimum of power is required to positively close the contacts and also a minimum of power is required to positively separate such contacts, this feature resulting in a structure that is long lived and necessitating a minimum amount of adjustment.

In the accompanying drawings illustrating the preferred embodiment of my invention, Fig. 1 is a side elevation of an electrical flatiron to which my invention has been applied;

Fig. 2 is a diagrammatic circuit arrangement of the control circuits and thermostatic devices associated therewith;

Fig. 3 is a sectional plan view on the line 3—3 of Fig. 1;

Fig. 4 is a vertical sectional elevation on the line 4—4 of Fig. 3;

Fig. 5 is a vertical sectional end elevation on the line 5—5 of Fig. 4, and

Fig. 6 is a sectional plan view showing the improved switch contact.

Referring to the drawings, 10 designates a base on the top of which is mounted an enclosing cover 11 which encloses the heating elements and also one of the thermostatic elements and on the top of this enclosing cover is mounted a U-shaped frame 12, the base, enclosing cover, and frame being secured together by cap nuts 13 that engage with studs (not shown) screwed into the base 10. The enclosing cover 11 has associated therewith a switch enclosing cover 14 that in turn has attached thereto a conduit 15 provided with a flexible spring member 16 and through which conduit and flexible spring pass the feed wires 17 leading from any suitable source of power, such feed wires 17 being connected in series with the heating element of the device through the contact plates 29 and 30, such heating element not being shown. One of the feed wires 17 is connected from its binding post 18 through a conductor 19 to the terminal 20 mounted on a member 21 attached to the outer end of one of the elements 22 of a thermostat, the other element 23 of which is secured to the base 10 by a pin 24 and has mounted thereon a contact post 25 which is connected by means of a conductor 26 to the secondary thermostat 50 at the lower end. 27 designates a U-shaped contact spring attached by one of its legs to the contact post 25 and on the other leg of such member 27 is secured a contact plate 28 adapted to be engaged by the contact 20. The legs of the U-shaped member 27 carrying the contact plate 28 is normally out of engagement with the contact 20. As the thermostatic element comprised of the members 22 and 23 becomes heated, relative movement takes place between the contact post 25 and the contact 20 due to the relative movement of the parts of the elements 22 and 23, and the contact 20 engages with the contact plate 28, forming the contact, completing the circuit for the secondary thermostat 50. Should the secondary thermostat 50 operate to throw out the switch blades 32 and 33 from the contact plates 29 and 30, the cooling down of the device will cause relative movement between the elements 22 and 23, but in the opposite direction, the contact 20 moving away from the contact plate 28 and the spring form of the member 27 insures a quick breaking of such contact.

The contact plates 29 and 30 are mounted one on each side of the insulating plate 31, such plate being made of mica, or any other suitable insulating material, and associated with such contact plates are the switch blades 32 and 33 secured to, but insulated from, one end of an internally threaded member 34 by insulating material 35, such switch blades, however, being electrically connected together by means of the rivet 36 of conducting material. Screwed into the member 34 is one end of a rod 37 which finds a bearing in a portion 38 of a sleeve 39, which sleeve is provided with a shoulder 40 adjacent the contact plates 29 and 30 and fits into the hollow handle 41 that is mounted on the top of the handle frame 12. The end of the member 39 adjacent the collar 38 is internally threaded to receive the threaded end of a sleeve 42 provided on its other end with a collar 43 that fits into the other end of the handle 41. Slidably mounted in the open end of the sleeve 42 is a plunger 44 that is screwed onto the end of the rod 37, a coil spring 53 lying within the sleeve 42 and surrounding the rod 37 engaging with the collar 38 and with the end of the slidable plunger 44 tends to force such plunger outwardly, or to the right, as shown in Fig. 4. Attached to the outer end of the plunger 44 is a knob of insulating material which limits the inward movement of the plunger 44 and by means of which said plunger 44 may be moved to the left, as viewed in Fig. 4. Formed on the under side of the member 34 is a notch 46 with which engages the hook end 47 of a release lever 48, this release lever being pivotally mounted in the enlarged end 40 of the sleeve 39 on the pivot 49. The end of the lever 48 remote from the hook end 47 lies in the path of movement of a thermostat 50, one end of the heating element of which is connected by the conductor 51 with the contact plate 30 while the other end of such heating element is connected to the main heating element. It will be apparent, from the construction just described, that, if the parts are in position shown in Fig. 4; that is, with the spring 53 compressed and with the hook member 47 in engagement with the notch 46 that, if sufficient current flows through the heating element of the thermostat 50 so as to heat the thermostat to such an extent as to cause its upper end to engage with the end of the lever 48, such lever will be rotated about its pivot point 49, releasing the hook end 47 from the notch 46 and the spring 53 will force the plunger 44 to the right, as shown in Fig. 4, and will therefore move the switch blades 32 and 33 out from engagement with the contact blades 29 and 30 respectively, breaking the circuit from the feed wires 17 to the heating element of the device.

The device will operate in the manner above described to insure safety of the apparatus and prevent damage being done thereto or thereby, the series circuit from the feed wires 17 to the heating element of the device being shunted either at the contacts 20, 28, and 25 or positively broken at the contact blades 29 and 30 and switch blades 32 and 33 respectively. It is desirable to be able to temporarily disconnect the heating element of the device from the feed wires 17 without detaching such feed wires from the source of current supply and without waiting for the thermostatic elements to heat up sufficiently to control the broken heating circuit. I have, therefore, provided an auxiliary operating device for the lever 48 which consists primarily of a rod or shaft 54 rotatably mounted in a frame member 55 and secured to said shaft is a forked member 56 which engages with the end of the lever 48 on each side thereof, as clearly shown in Figs. 4 and 5. Surrounding the shaft 54 is a spring 57, one end of which bears against the frame member 55 while the other end engages with a depending arm 58 of the member 56 which tends to throw the lower free end of the member 58 outward to the right, as shown in Fig. 5, and therefore tends to force the hook end 47 into closer engagement with the notch 46. Secured at its lower end to a frame member 55 is a spring 59, the upper free end of which engages the lower free end of the member 58 and such upper free end of the member 59 is in alinement with the perforation in an enclosing member 60 and slidably mounted in this perforation in a line at right angles to the spring 59 is a plunger 61 provided on its outer end with a button 62 and in a position to be easily engaged by the forefinger of the operator of the device. From the above it will be obvious that, with the elements of the device assembled as above described and in the position illustrated in Figs. 4 and 5, regardless of whether or not the thermostatic elements are controlled by the heat to operate the auxiliary switching device, pressure on the button 62 will cause the plunger 61 to force the upper free end of the spring 59 to the left, as viewed in Fig. 5, rotating the shaft 54 in its bearings and causing the forked member 56 to engage with the end of the lever 48, lifting such end upwardly and forcing the hook portion 49 out from engagement with the notch 46 when the spring 53 will move the switch blades 32 and 33 out of engagement with the contact plates 29 and 30 respectively.

It will be obvious from the above that I have provided, in a device of this character, an additional feature of convenience and safety, which will be useful when it is desired to retain the device connected to a source of supply and not be obliged to disconnect such source of supply from the heating element within the device without disconnecting the feed wires of the device from the source of supply. It will be obvious, also, that, while I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. In a device of the class described, the combination of a source of power, a switch for connecting the same to the heating element of the device, a thermostat associated with the heating element, a second thermostat associated with said switch and controlled by the first thermostat to operate the switch to disconnect the source of power from the heating element, and manually operable means for controlling said switch independently of the thermostat.

2. In a device of the class described, the combination of a source of power, a heating element, a switch interposed between the source of power and a heating element, thermostatic controls for said switch operable by the heat given off by the heated member, and manually controlled means for said switch operable independently of the thermostats.

3. In a device of the class described, the combination of a source of power, a heating element, a switch interposed between the source of power and a heating element, thermostatic controls for said switch, means for manually operating said switch to connect the source of power with the heating element and place the switch under control of the thermostats, and manually operable means for said switch for disconnecting the source of power from the heating element independently of the operation of the thermostats.

4. In a device of the class described, the combination of a source of power, a heating element, a switch interposed between the source of power and heating element, thermostatic controls for said switch, one of said thermostats being remote from the heating element, means for manually operating said switch to connect the source of power with the heating element and place the switch under control of the thermostats, and manually operable means for said switch for disconnecting the source of power from the heating element independently of the operation of the thermostats.

In testimony whereof, I have signed my name to this specification.

JOHN E. HARVEY.